United States Patent
Retano et al.

(10) Patent No.: US 8,699,382 B2
(45) Date of Patent: Apr. 15, 2014

(54) NETWORK TOPOLOGIES FOR ENERGY EFFICIENT NETWORKS

(75) Inventors: Alvaro Retano, Raleigh, NC (US); Michael Barnes, Boulder Creek, CA (US); Russell I. White, Holly Springs, NC (US); Alan Patrick Sheridan, Raleigh, NC (US); Stanley M. Ratliff, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 687 days.

(21) Appl. No.: 13/019,157

(22) Filed: Feb. 1, 2011

(65) Prior Publication Data
US 2012/0195205 A1 Aug. 2, 2012

(51) Int. Cl.
*H04L 12/28* (2006.01)
*H04L 12/56* (2006.01)
*H04W 40/24* (2009.01)

(52) U.S. Cl.
CPC .......... *H04L 45/123* (2013.01); *H04W 40/246* (2013.01)
USPC ...................................................... 370/255

(58) Field of Classification Search
USPC .......................... 370/254–255; 709/238–244
See application file for complete search history.

(56) References Cited

U.S. PATENT DOCUMENTS

| | | | |
|---|---|---|---|
| 5,682,479 A | 10/1997 | Newhall et al. | |
| 6,363,319 B1 | 3/2002 | Hsu | |
| 6,625,124 B1 | 9/2003 | Fan et al. | |
| 2002/0013856 A1 | 1/2002 | Garcia-Luna-Aceves et al. | |
| 2006/0153081 A1* | 7/2006 | Simonsson et al. | 370/238 |
| 2007/0070983 A1* | 3/2007 | Redi et al. | 370/352 |
| 2007/0248067 A1* | 10/2007 | Banerjea et al. | 370/338 |
| 2008/0031250 A1* | 2/2008 | Mehta et al. | 370/392 |
| 2012/0198092 A1 | 8/2012 | Sheridan et al. | |

OTHER PUBLICATIONS

U.S. Appl. No. 13/019,136, filed Feb. 1, 2011, Sheridan.
A. Patrick Sheridan, U.S. Appl. No. 13/019,136, Non-final Office Action from US PTO, Jan. 22, 2013.
A. Patrick Sheridan, U.S. Appl. No. 13/019,136, Response to Non-final Office Action from US PTO, Apr. 22, 2013.

* cited by examiner

*Primary Examiner* — Jeffrey M Rutkowski
(74) *Attorney, Agent, or Firm* — Baker Botts L.L.P.

(57) ABSTRACT

One embodiment identifies all one-hop neighbor nodes and two-hop neighbor nodes of a node; determines an active set of one-hop neighbor nodes for the node, comprising: includes in the active set each one-hop neighbor node that is either an edge node or connected with at least one two-hop neighbor node with which no other one-hop neighbor nodes are connected; and if the active set is not yet complete, then: determine all combinations of one-hop neighbor nodes that are not already in the active set; and tests each combination in order of each combination's total-energy value to determine whether a specific combination is able to complete the active set; if no combination is able to complete the active set, then including all one-hop neighbor nodes in the active set; and communicates a message to each one-hop neighbor node in the active set indicating that it is in the active set.

16 Claims, 5 Drawing Sheets

NETWORK TOPOLOGIES FOR ENERGY EFFICIENT NETWORKS

TECHNICAL FIELD

This disclosure generally relates to network topologies and more specifically relates to creating network topologies that reduce energy consumption throughout computer networks.

BACKGROUND

Energy Efficiency is a popular concept in the modern era, especially among people who are conscious of environmental issues. Reducing energy consumption in computer networks brings about many benefits, the least of which including reducing operation costs and saving energy and thus the environment.

To ensure performance quality, computer networks, especially large networks such as those associated with data centers or large institutions, often include a great number of routers and contain a high amount of coupling and redundancy between these routers in order to provide fast data transfer and recovery rates. Consequently, the largest energy consumption in a computer network is often in the individual routers, such as the energy required to maintain, process, and operate each router. In comparison, the energy required to actually transfer data over a computer network is relatively insignificant.

Network usage typically varies depending on the time of the day or the day of the week. For example, at nights or on weekends, network usage is often low because less people are working. And yet, the routers are kept running at all hours and thus consume large amounts of energy even when their usage is low. Energy is needlessly wasted as a result.

DESCRIPTION OF EXAMPLE EMBODIMENTS

Often, the largest energy consumption in a computer network is in the individual routers. Therefore, by eliminating unnecessary routers from a network, large amounts of energy may be saved over time. One way to eliminate unnecessary routers from a computer network is through network topology reduction. Many forms of topology reduction, such as Dijkstra's algorithm, mid-sum routes, DFS numbering, and min-metric, have been implemented and used over time. However, the existing forms of topology reduction usually require full knowledge of the topology of a network, or focus on eliminating only unnecessary connections between routers instead of eliminating unnecessary router nodes throughout the network.

Particular embodiments take into account the energy consumption of the individual nodes (e.g., routers) in a computer network in order to design minimal topologies for the computer network so that during periods of low network usage or downtime, large amounts of energy may be saved. Particular embodiments utilize a protocol-independent algorithm to dynamically determine minimal topologies for computer networks. In particular embodiments, the algorithm is protocol independent because it is not necessary for each node in a network to have any knowledge of the full topology of the network. In particular embodiments, the algorithm not only optimizes energy usage in a network, but maintains a performance standard in order to guarantee that the network does not lose its ability to perform the necessary tasks.

Figure 1:
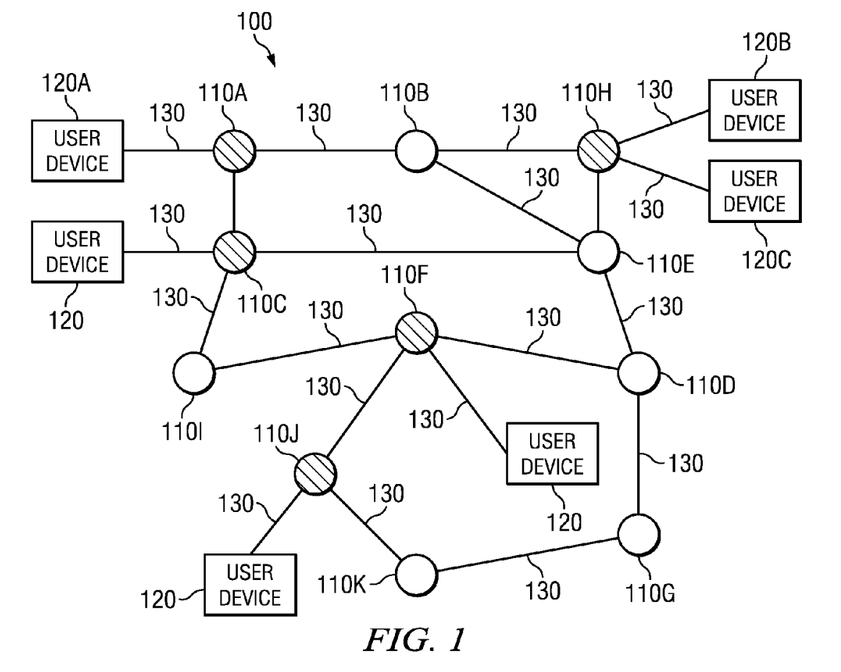
FIG. 1 illustrates an example computer network that includes an arbitrary number of nodes.

FIG. 1 illustrates an example computer network 100 that includes an arbitrary number of nodes 110. For example, a node 110 may be a router. Two nodes 110 may be connected with a link 130 (e.g., a communications link). Note that only a small number of nodes and connections are illustrated in FIG. 1 as an example, and in practice, a computer network may include any number of nodes connected according to any suitable topology. In particular embodiments, each node 110 may include hardware, software, or embedded logic components or a combination of two or more such components capable of carrying out the appropriate functionalities implemented or supported by such a node. In particular embodiments, each node 110 may have an identifier and a power or energy consumption value; and each link 130 between two nodes may have a bandwidth. In particular embodiments, the identifier of each node 110 may be unique within network 100. In particular embodiments, the power consumption value of each node 110 is its energy cost and is measured by a power-consumption metric determined based on the type and configuration of the node 110.

In particular embodiments, a node 110 in network 100 may be directly connected with one or more other nodes 110. For example, in FIG. 1, node 110A is directly connected with nodes 110B and 110C; node 110D is directly connected with nodes 110E, 110F, and 110G; and node 110G is directly connected with nodes 110D and 110K. In particular embodiments, a node 110 may be directly connected with one or more user devices 120, such as personal computers, tablets, smart telephones, or game devices. For example, in FIG. 1, node 110A is directly connected with user device 120A, while node 110H is directly connected with user devices 120B and 120C. In particular embodiments, two components (e.g., two nodes or a node and a user device) are directly connected when there is a direct link with no other component between them. Thus, node 110A is directly connected to node 110B, but is not directly connected to node 110E because there is no direct link between nodes 110A and 110E.

In particular embodiments, if a node is directly connected with one or more user devices, it is referred to as an "edge node" (e.g., an edge router). In particular embodiments, when determining a minimal topology for a network, all edge nodes in the network are kept alive and online at all times.

Each node 110 has a first-hop neighborhood (also referred to as a one-hop neighborhood) and a second-hop neighborhood (also referred to as a two-hop neighborhood). For each node 110, its first-hop neighborhood includes all the other nodes that are directly connected with the node 110—all the other nodes that are one hop from node 110. For example, in FIG. 1, the first-hop neighborhood of node 110A includes nodes 110B and 110C, while the first-hop neighborhood of node 110E includes nodes 110B, 110C, 110D, and 110H. For each node 110, its second-hop neighborhood includes all the other nodes that are directly connected with any node in the first-hop neighborhood of the node 110—all the other nodes that are two hops from node 110. In other words, for each node 110, its second-hop neighborhood includes all the other nodes that are connected with the node 110 via only one other node. For example, in FIG. 1, the second-hop neighborhood of node 110A includes nodes 110E, 110H, and 110I, while the second-hop neighborhood of node 110G includes nodes 110E, 110F, and 110J. Node 110I connects with node 110A via only node 110C, and node 110C is in the first-hop neighborhood of node 110A. Similarly, node 110E connects with node 110A via only node 110B along one path or via only node 110C along another path, and both nodes 110B and 110C are in the first-hop neighborhood of node 110A. Note that as these examples illustrate, the first-hop and second-hop neighborhoods are determined with respect to each specific node 110, and the first-hop and second-hop neighborhoods of one node may differ from the first-hop and second-hop neighborhoods of another node. In addition, it is possible that a node may not have any second-hop neighbors (e.g., when there are only a few nodes in the network). Furthermore, in particular embodiments, if a first node is connected with a second node via multiple paths, then the shortest path between the first node and the second node is used to determine how many hops there are between the two nodes. Thus, for example, if the first node is directly connected with the second node on the one hand (one hop) and connected with the second node via a third node on the other hand (two hops), the first node and second node are considered one-hop neighbors to each other.

Between any two nodes 110, there may be one or more paths. For example, in FIG. 1, from node 110A to node 110C, a first path may go from node 110A directly to node 110C; a second path may go from node 110A to node 110B to node 110E to node 110C; and a third path may go from node 110A to node 110B to node 110H to node 110E to node 110C. Of course, the first path is shorter and thus generally more preferable than the second path, which is in turn shorter than the third path. In particular embodiments, each path between two nodes 110 may be associated with a cost, which may be the cost involved in transferring data from one node 110 to the other node 110 along this path. Particular embodiments may determine the cost of each path based on various factors, such as, for example and without limitation, the total number of nodes along the path, the cost of operating the individual nodes, the cost of maintaining the connections between the nodes, the time it takes to transfer the data, and the delay along the path.

In particular embodiments, when determining a minimal topology for a computer network for the purpose of reducing power consumption, the algorithm used to determine the minimal topology may take into consideration any number of constraints or requirements, such as performance requirements for the network formed according to the resulting topology.

In particular embodiments, one constraint may be a "baseline bandwidth" (also referred to as "minimum bandwidth"), which is the minimum bandwidth that needs to be maintained across the network formed according to the resulting topology. In particular embodiments, the baseline bandwidth may be represented as various metrics, such as, for example and without limitation, delays and transfer rates. In particular embodiments, the baseline bandwidth may be specified by a human user or determined based on system performance requirements. When determining a minimal topology for a network, particular embodiments determine an active set of nodes for each node in the network (described in more detail below in connection with FIG. 3). The active set of nodes of a specific node includes a minimum set of one-hop neighbors of that specific node that is necessary to support the baseline bandwidth requirement.

In particular embodiments, another constraint may be a minimum number of active paths in the network formed according to the resulting topology. That is, if the minimum number of active paths is n (n>=1), then there should be at least n active paths between pairs of nodes in the network. In particular embodiments, the minimum number of active paths may be specified by a human user. For example, a user may specify that the minimum number of active paths is 1 (e.g., one path between each pair of nodes), which results in a minimal topology. Alternatively, the user may specify that the minimum number of active paths is 2 (e.g., two paths between each pair of nodes), so that there may be a primary path and an alternate path for fast recovery. Note that increasing the minimum number of paths necessarily decreases the percentage of nodes (e.g., routers) that can be removed from service and thus decreases the amount of energy that may be reduced.

In particular embodiments, these constraints (e.g., baseline bandwidth, minimum number of active paths) may be supplied to the algorithm used to determine a minimal topology for a network as inputs.

Figure 2:
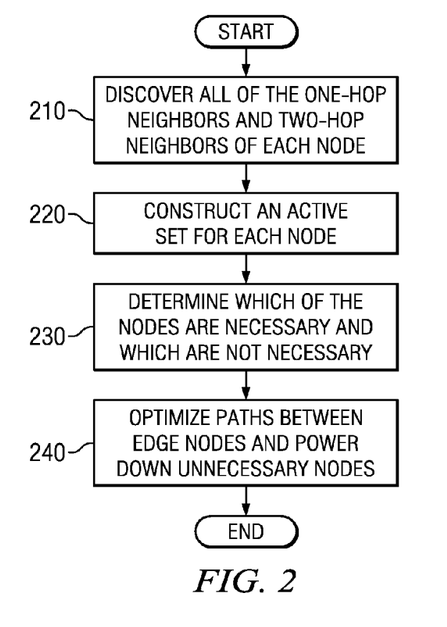
FIG. 2 illustrates an example method for determining a minimal topology for a computer network in order to reduce power consumption throughout the network.
Figure 6:
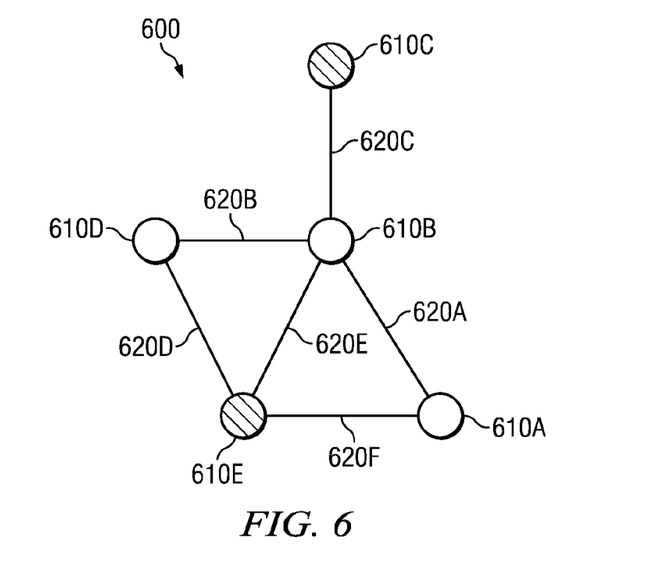
FIG. 6 illustrates an example computer network.

FIG. 2 illustrates an example method for determining a topology for a computer network in order to reduce power consumption throughout the network. In particular embodiments, specific steps illustrated in FIG. 2 are similarly performed with respect to each and every node in a network. For purpose of clarification, let the specific node in connection with which a step is performed be referred to as the "current node". In addition, FIG. 6 illustrates a simplified network 600 that includes five nodes 610A-610E connected by six links 620A-620F. Suppose that, for this example, nodes 610C and 610E are edge nodes—nodes that are directly connected with user devices. The steps illustrated in FIG. 2 are explained using network 600 as an example.

In particular embodiments, each node in the network has an identifier and a power consumption value, and each link between two nodes has a bandwidth. In particular embodiments, the node identifiers may be numbers, alphabets, or a combination thereof For purpose of clarification, let ID denote the identifier of a node, PC denote the power consumption value of a node, and BW denote the bandwidth of a link. Furthermore, let $BW_{base}$ denote the baseline bandwidth and $P_{min}$ denote the minimum number of paths specified, for example, by a user that the resulting topology needs to satisfy.

Particular embodiments may discover all of the first-hop neighbors (also referred to as one-hop neighbors) and second-hop neighbors (also referred to as two-hop neighbors) of each node in a network, as illustrated in STEP 210. As described above, with respect to a current node, a one-hop neighbor of the current node is another node that is directly connected with the current node. A two-hop neighbor of the current node is another node that is directly connected with a one-hop neighbor of the current node. In other words, a two-hop neighbor of the current node is another node that is connected with the current node via only one other node. In FIG. 6, with respect to node 610A, the one-hop neighbors of node 610A include nodes 610B and 610E, and the two-hop neighbors of node 610A include nodes 610C and 610D. With respect to node 610B, the one-hop neighbors of node 610B include nodes 610A, 610C, 610D, and 610E, and node 610B does not have any two-hop neighbors because it is directly connected with each of the other nodes in network 600.

Each node may discover its one-hop neighbors and two-hop neighbors by any suitable means. For example, a current node may be aware of all the other nodes with which it is directly connected, and thus, the current node may compile a list of its one-hop neighbors to include these directly connected nodes. The current node may request, from each of its one-hop neighbors, a list of all the nodes directly connected with each of the one-hop neighbors, and based on this information, compile a list of its two-hop neighbors.

Particular embodiments may construct an active set of one-hop neighbors for each node in the network, as illustrated in STEP 220. In particular embodiments, the active set of one-hop neighbors of a node is a minimal set of one-hop neighbors of the node that is necessary to support the baseline bandwidth $BW_{base}$. This step is described in more detail in FIG. 3.

Once the active set of one-hop neighbors of each node has been determined, particular embodiments may further determine which specific nodes are necessary and which are not, as illustrated in STEP 230. This step is described in more detail in FIG. 4.

Finally, particular embodiments may optimize the paths between the edge nodes and power down those nodes that are not necessary in order to reduce power consumption in the network, as illustrated in STEP 240. This step is described in more detail in FIG. 5.

Figure 3:
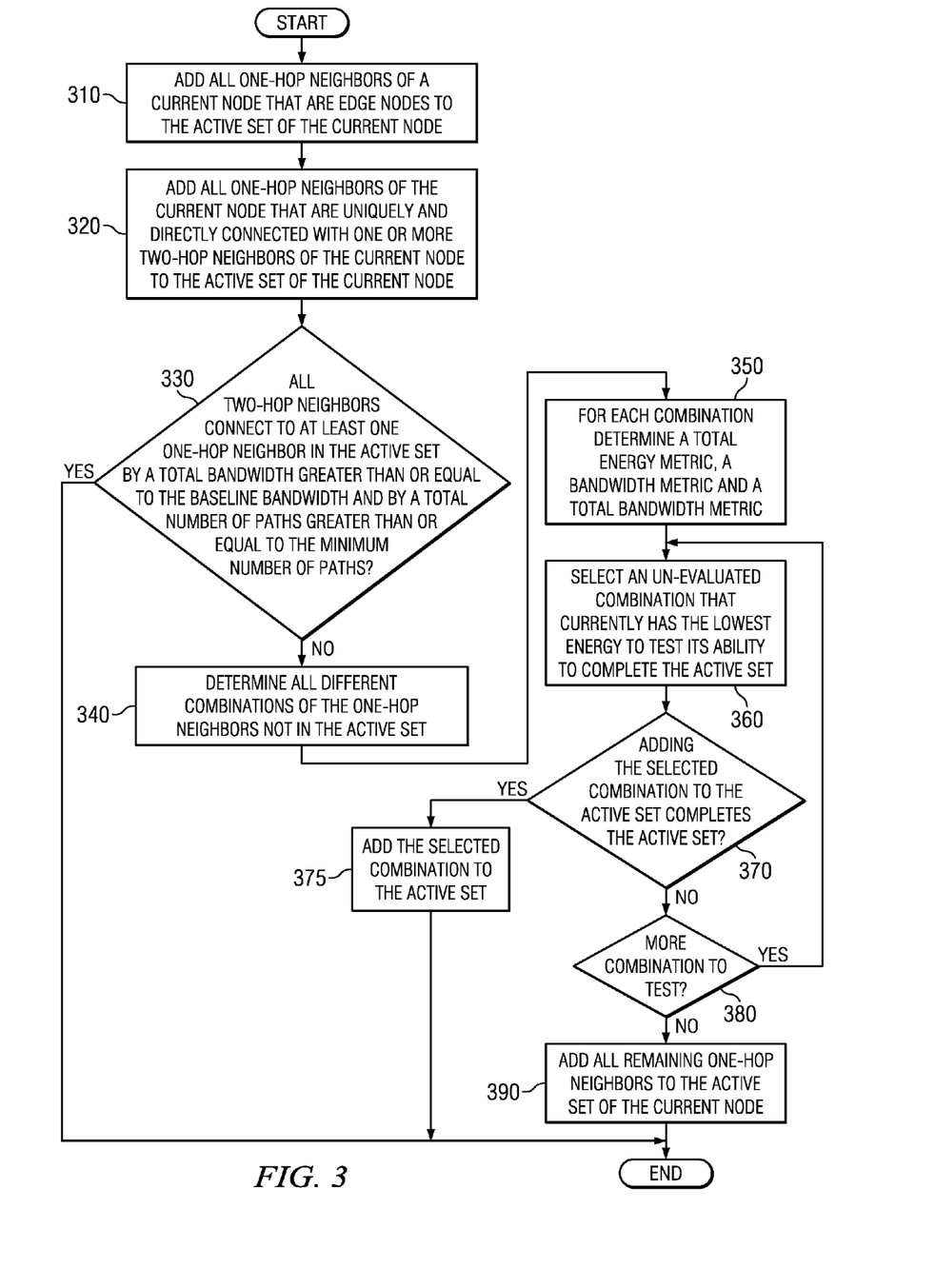
FIG. 3 illustrates an example method for determining an active set of one-hop neighbors for a specific node.

FIG. 3 illustrates an example method for determining an active set of one-hop neighbors for a specific node in a network. The steps illustrated in FIG. 3 may be similarly performed with respect to each node in a network (e.g., network 600) in order to determine an active set for each node. For purpose of clarification, let the specific node in connection with which a step is performed be referred to as the "current node". Thus, terms such as one-hop neighbors, two-hop neighbors, and active set are all with respect to the current node.

Particular embodiments add all of the one-hop neighbors of a current node that are also edge nodes to the active set of the current node, as illustrated in STEP 310.

In FIG. 6, suppose that node 610A is selected as the current node. Nodes 610B and 610E are the one-hop neighbors of node 610A. Node 610B is not an edge node and therefore is not added to the active set of node 610A. On the other hand, node 610E is an edge node and therefore is added to the active set of node 610A. At this point, the active set of node 610A includes node 610E.

Suppose that node 610B is selected as the current node. Nodes 610A, 610C, 610D, and 610E are all its one-hop neighbors. In this case, nodes 610C and 610E are added to the active set of node 610B because these two are edge nodes. Nodes 610A and 610D are not added to the active set of node 610B because they are not edge nodes.

Suppose that node 610E is selected as the current node. Its one-hop neighbors include nodes 610A, 610B, and 610D, none of which is an edge node. Thus, none of the one-hop neighbors of node 610E is added to its active set at this point.

Particular embodiments add all of the remaining one-hop neighbors of the current node that are uniquely and directly connected with one or more two-hop neighbors of the current node to the active set of the current node, as illustrated in STEP 320. In other words, if a one-hop neighbor of the current node, which has not been included in the active set of the current node during STEP 310, is directly connected with at least one two-hop neighbor of the current node, and this two-hop neighbor cannot be reach by the current node through any other one-hop neighbor of the current node, then the one-hop neighbor is added to the active set of the current node.

In FIG. 6, with respect to node 610A as the current node, node 610B is the remaining one-hop neighbor of node 610A that has not been added to the active set of node 610A. Node 610B directly connects with nodes 610C and 610D, which are both two-hop neighbors of node 610A. Node 610A can reach node 610D through either node 610B or node 610E. In this case, node 610B is not the only one-hop neighbor that connects node 610A to node 610D, and based on node 610D, node 610B would not be added to the active set of node 610A. However, node 610A can reach node 610C only through node 610B. In this case, node 610B is the only one-hop neighbor that connects node 610A to node 610C. Based on node 610C, node 610B should be added to the active set of node 610A. At this point, the active set of node 610A includes both nodes 610B and 610E.

With respect to node 610B as the current node, node 610B does not have any two-hop neighbors. Therefore, no remaining one-hop neighbor of node 610B (e.g., node 610A or node 610D) is added to the active set of node 610B at this point.

With respect to node 610E as the current node, nodes 610A, 610B, and 610D are the one-hop neighbors of node 610E that have not been included in the active set of node 610E. Among these three one-hop neighbors, node 610B uniquely and directly connects node 610E with node 610C, which is a two-hop neighbor of node 610E. That is, node 610E can reach node 610C only through node 610B. Therefore, node 610B is added to the active set of node 610E at this point.

Particular embodiments determines whether the active set of the current node is complete, as illustrated in STEP 330. The active set of the current node is complete if all of the two-hop neighbors of the current node are connected to one or more one-hop neighbors of the current node that are included in the active set of the current node (1) by a total bandwidth greater than or equal to the baseline bandwidth $BW_{base}$, and (2) by a total number of paths greater than or equal to the minimum number of paths $P_{min}$. Recall that in particular embodiments, $BW_{base}$ and $P_{min}$ may be specified by a user.

In FIG. 6, with respect to node 610A as the current node, after STEPS 310 and 320, the active set of node 610A includes nodes 610B and 610E. The two-hop neighbors of node 610A are nodes 610C and 610D. Two-hop neighbor node 610C is directly connected to one-hop neighbor node 610B in the active set; and two-hop neighbor node 610E is directly connected to both one-hop neighbor nodes 610B and 610E in the active set. Thus, all of the two-hop neighbor nodes of node 610A are connected to one or more one-hop neighbor nodes of node 610A in the active set. Next, there are three links through which nodes 610C and 610D are connected with nodes 610B and 610E. Specifically, node 610C connects with node 610B via link 620C; node 610D connects with node 610B via link 620B; and node 610D connects with node 610E via link 620D. Each link has a bandwidth. The total bandwidth is the sum of the bandwidths of the three individual links 620B, 620C and 620D ($BW_{total}=BW_{620B}+BW_{620C}+BW_{620D}$). This total bandwidth $BW_{total}$ needs to be greater than or equal to the baseline bandwidth $BW_{base}$ in order for the active set of node 610A to be complete. Finally, there are a total three paths ($P_{total}=3$), through links 620B, 620C, and 620D, that the two-hop neighbor nodes 610C and 610D are connected with the one-hop neighbor nodes 610B and 610E in the active set. This total number of paths $P_{total}$ needs to be greater than or equal to the minimum number of paths $P_{min}$ in order for the active set of node 610A to be complete. That is, if the total bandwidth $BW_{total}$ is greater than or equal to the baseline bandwidth $BW_{base}$ and the total number of paths $P_{total}$ is greater than or equal to the minimum number of paths $P_{min}$, then the active set of node 610A is complete. Otherwise, the active set is not yet complete. Note that in this case, since all of the one-hop neighbors of node 610A are included in its active set, the active set is complete.

With respect to node 610B as the current node, after STEPS 310 and 320, the active set of node 610B includes nodes 610C and 610E. Node 610B does not have any two-hop neighbors. Therefore, the active set of node 610B is also complete.

With respect to node 610E as the current node, after STEPS 310 and 320, the active set of node 610E includes node 610B. Node 610E has only one two-hop neighbor node 610C, which is connected to node 610B via link 620C. The total bandwidth is the bandwidth of link 620C ($BW_{total}=BW_{620C}$), and the total number of paths is 1 ($P_{total}=1$). Again, if the total bandwidth $BW_{total}$ is greater than or equal to the baseline bandwidth $BW_{base}$ and the total number of paths $P_{total}$ is greater than or equal to the minimum number of paths $P_{min}$, then the active set of node 610E is complete. Otherwise, the active set is not yet complete.

For the current node, if its active set is complete at this point (STEP 330, "YES"), then the active set of one-hop neighbors of the current node has been obtained. On the other hand, if the active set is not yet complete at this point (STEP 330, "NO"), then additional one-hop neighbors of the current node may need to be included in the active set in order to complete the active set.

Suppose the active set of the current node is not yet complete, particular embodiments determine all different combinations of the one-hop neighbors of the current node that are not yet included in the active set of the current node, as illustrated in STEP 340.

As an example, suppose that the current node has four one-hop neighbors: n1, n2, n3, n4, and among these, node n4 has already been included in the active set of the current node. The remaining three one-hop neighbors not yet included in the active set of the current node are n1, n2, and n3. The combinations of the three remaining one-hop neighbors are: {n1}, {n2}, {n3}, {n1, n2}, {n1, n3}, {n2, n3}, and {n1, n2, n3}.

In FIG. 6, with respect to node 610E as the current node, suppose that the active set of node 610E is not yet complete after STEPS 310 and 320. At this point, the one-hop neighbors of node 610E that are not included in its active set are nodes 610A and 610D. There are three different combinations of these two one-hop neighbor nodes: {610A}, {610D}, and {610A, 610D}.

For each combination of the remaining one-hop neighbors, particular embodiments determine a total energy metric, a bandwidth metric for each two-hop neighbor, and a total bandwidth metric, as illustrated in STEP 350. In particular embodiments, the total energy metric of each combination of the remaining one-hop neighbors is the sum of the assumed energy usage of each node in that combination. In particular embodiments, the assumed energy usage of a node may be its power consumption value PC. For example, with respect to node 610E in FIG. 6, the total energy metric for combination {610A} may be the power consumption value of node 610A ($PC_{610A}$), and the total energy metric for combination {610A, 610D} may be the sum of the power consumption values of nodes 610A and 610D ($PC_{610A}+PC_{610D}$).

In particular embodiments, for each combination of the remaining one-hop neighbors, there is a bandwidth metric for each two-hop neighbor. That is, there is a bandwidth metric associated with each path connecting the current node through the one-hop neighbors in that combination with each two-hop neighbor. Since this bandwidth is determined on a per-path basis, it may be referred to as an individual bandwidth (as opposed to the total bandwidth). In particular embodiments, this bandwidth metric may be used to determine equal-cost paths (e.g., paths having the same bandwidth) to a specific two-hop neighbor node; however, each path is still limited by the baseline or minimum bandwidth. In particular embodiments, the individual bandwidth may be a sum of the equal-cost paths to a specific two-hop neighbor node.

In particular embodiments, for each combination of the remaining one-hop neighbors, there is a total bandwidth metric, which is the sum of all the bandwidth metrics for all the two-hop neighbors. That is, the total bandwidth metric for each combination is the sum of all the bandwidth metrics associated with the paths connecting the one-hop neighbors in that combination with the two-hop neighbors.

Particular embodiments iterate through these different combinations of the remaining one-hop neighbors, one combination at a time, starting with the combination that has the lowest total energy (measured by the total energy metric of the combination) and ending with the combination that has the highest total energy (again, measured by the total energy metric of the combination), and test whether each combination may complete the active set of the current node. In particular embodiments, when selecting a specific combination for testing, if multiple combinations have the same total energy level, then the combination that has the highest total bandwidth (measured by the total bandwidth metric of the combination) is selected first. Furthermore, in particular embodiments, when selecting a specific combination for testing, if multiple combinations have the same total energy level and the same total bandwidth, then the combination that has a node with the lowest identifier is selected first, or, alternatively, the combination that has the lowest sum of the identifiers of the nodes in the combination is selected first.

More specifically, particular embodiments select a combination of the remaining one-hop neighbors that has not been evaluated and that has the lowest total energy among the untested combinations, as illustrated in STEP 360. Particular embodiments then determine whether adding the one-hop neighbors in the selected combination to the active set of the current node would complete the active set of the current node, as illustrated in STEP 370.

As described above in connection with STEP 330, if after adding the one-hop neighbors in the selected combination to the active set of the current node, all of the two-hop neighbors of the current node are connected to one or more one-hop neighbors of the current node that are included in the active set of the current node (1) by a total bandwidth greater than or equal to the baseline bandwidth $BW_{base}$, and (2) by a total number of paths greater than or equal to the minimum number of paths $P_{min}$, then the active set of the current set is complete. Otherwise, the active set is not yet complete.

If adding the one-hop neighbors in the selected combination to the active set of the current node completes the active set (STEP 370, "YES"), then particular embodiments add all of the one-hop neighbors in the selected combination to the active set, as illustrated in STEP 375. At this point, the active set of one-hop neighbors of the current node has been obtained. On the other hand, if adding the one-hop neighbors in the selected combination to the active set of the current node does not complete the active set (STEP 370, "NO"), particular embodiments determine whether there is any more combination of the remaining one-hop neighbors that has not been evaluated, as illustrated STEP 380. If so (STEP 380, "YES"), particular embodiments selects another un-evaluated combination that currently has the lowest total energy for testing and repeat STEPS 360, 370, 380 for another iteration. On the other hand, if there is no more combination left to be tested, particular embodiments add all of the remaining one-hop neighbors of the current node to the active set of the current node to complete the active set, as illustrated in STEP 390.

Figure 4:
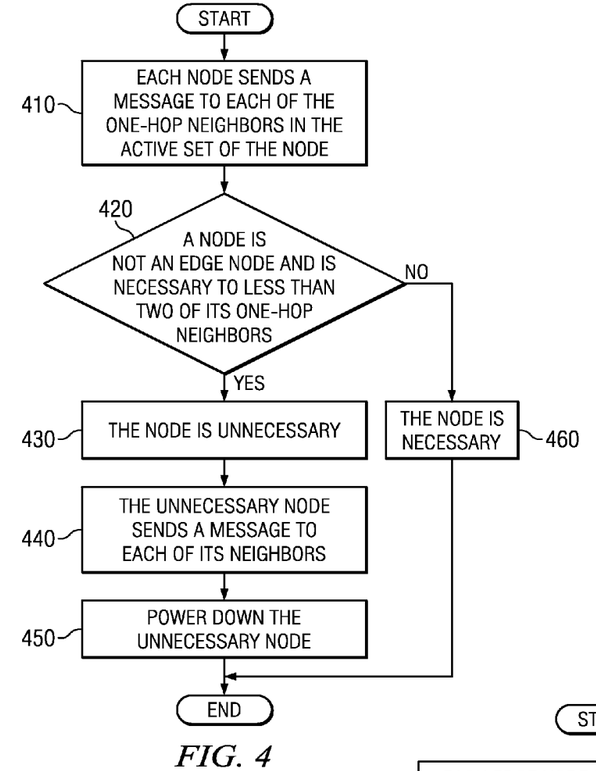
FIG. 4 illustrates an example method for determining which one-hop neighbors in an active set of a specific node are necessary and which are unnecessary.

FIG. 4 illustrates an example method for determining which one-hop neighbors in an active set of a specific node are necessary and which are unnecessary. At this point, each node has an active set that includes its one-hop neighbors that are necessary to satisfy the baseline-bandwidth requirement (represented as $BW_{base}$) and the minimum-number-of-paths requirement (represented as $P_{min}$).

In particular embodiments, each node sends a message (e.g., a "hello" message) of each of its one-hop neighbors included in the active set of the node, as illustrated in STEP 410. In particular embodiments, each node then identifies whether it is necessary in the current topology, as illustrated in STEPS 420-460. Note that STEPS 420-460 may be similarly performed with respect to each node.

In particular embodiments, if a node is an edge node (e.g., directly connected with one or more user devices), or if the node is necessary to two or more if its neighboring nodes, then the node is necessary. Otherwise, the node is not necessary. In other words, if a node is not an edge node and is necessary for connectivity purposes to less than two of its neighbors, then the node is not necessary in the current topology configuration, as illustrated in STEP 420. For example, a node is necessary to less than two of its neighbors if the node is directly connected with less than two of its neighbors.

In particular embodiments, if the node is not necessary, as illustrated in STEP 430, the unnecessary node sends a message to each of its one-hop neighbors, informing them that the unnecessary node is about to be shut down because it is not necessary to the current configuration of the network topology, as illustrated in STEP 440. This also enables each neighbor node of the unnecessary node to determine whether that neighbor node itself is still necessary to the current configuration of the topology. For example, if a neighbor node's only path derives from the unnecessary node, that neighbor node may also be unnecessary to the current configuration of the topology.

In particular embodiments, the unnecessary node is powered down to reduce power consumption in the network, as illustrated in STEP 450. On the other hand, if the node is necessary, as illustrated in STEP 460, the necessary node remains alive (e.g., power on).

Figure 5:
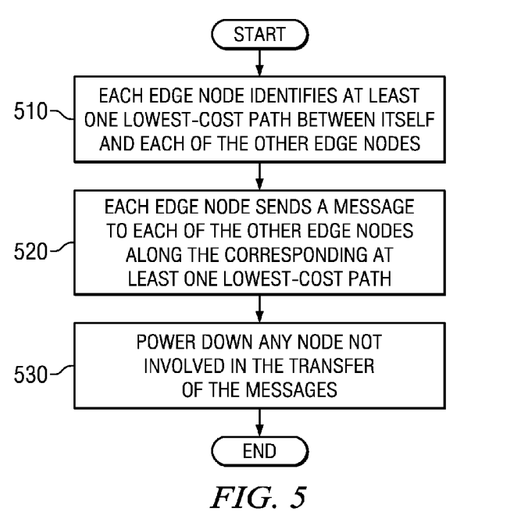
FIG. 5 illustrates an example method for optimizing paths between edge nodes.

FIG. 5 illustrates an example method for optimizing paths between edge nodes. At this point, each node has an active set of one-hop neighbors, and each node has determined whether it is necessary to the current configuration of the network topology. Furthermore, the unnecessary nodes have been shut down, and only the necessary nodes remain. Particular embodiments further optimize the paths between the edge nodes that are directly connected with user devices.

In particular embodiments, each edge node identifies one or lowest-cost paths (e.g., in terms of energy cost) between itself and each other edge node, as illustrated in STEP 510. In particular embodiments, the total energy cost of a path may be the sum of the energy costs of the individual nodes along that path. In particular embodiments, between two edge nodes, the path that has the lowest total emery cost is considered the lowest-cost path. For two edge nodes, if there are multiple paths connecting the two edge nodes that have the same total energy cost, the total minimum bandwidth of these equal-cost paths must be greater than or equal to the baseline bandwidth $BW_{base}$. In particular embodiments, each edge node may construct a routing table that contains these lowest-cost paths to the other edge nodes. In particular embodiments, each edge node maintains a routing table that contains the identified lowest-cost paths to all of the other edge nodes.

In particular embodiments, each edge node sends a message (e.g., a test packet) to each other edge node along the corresponding lowest-cost path, as illustrated in STEP 520

In particular embodiments, any node (e.g., not edge node) that is not involved in the transferring of the messages between the edge nodes along the lowest-cost paths are no longer necessary and may be shut down to reduce power consumption in the network.

At this point, the remaining nodes that are still alive form a minimal topology for the computer network that reduces power consumption while satisfying the baseline-bandwidth and minimum-number-of-paths requirements.

Topologies may be dynamically determined for a network using the methods illustrated in FIGS. 2-5. For example, different topology profiles may be constructed for different times of the day (e.g., morning, afternoon, evening, or night) or different days of the week (e.g., weekdays and weekends). For each topology profile, a user may specify the appropriate baseline bandwidth and minimum number of paths, so that the network may be optimized based on different metrics under different circumstances.

Figure 7:
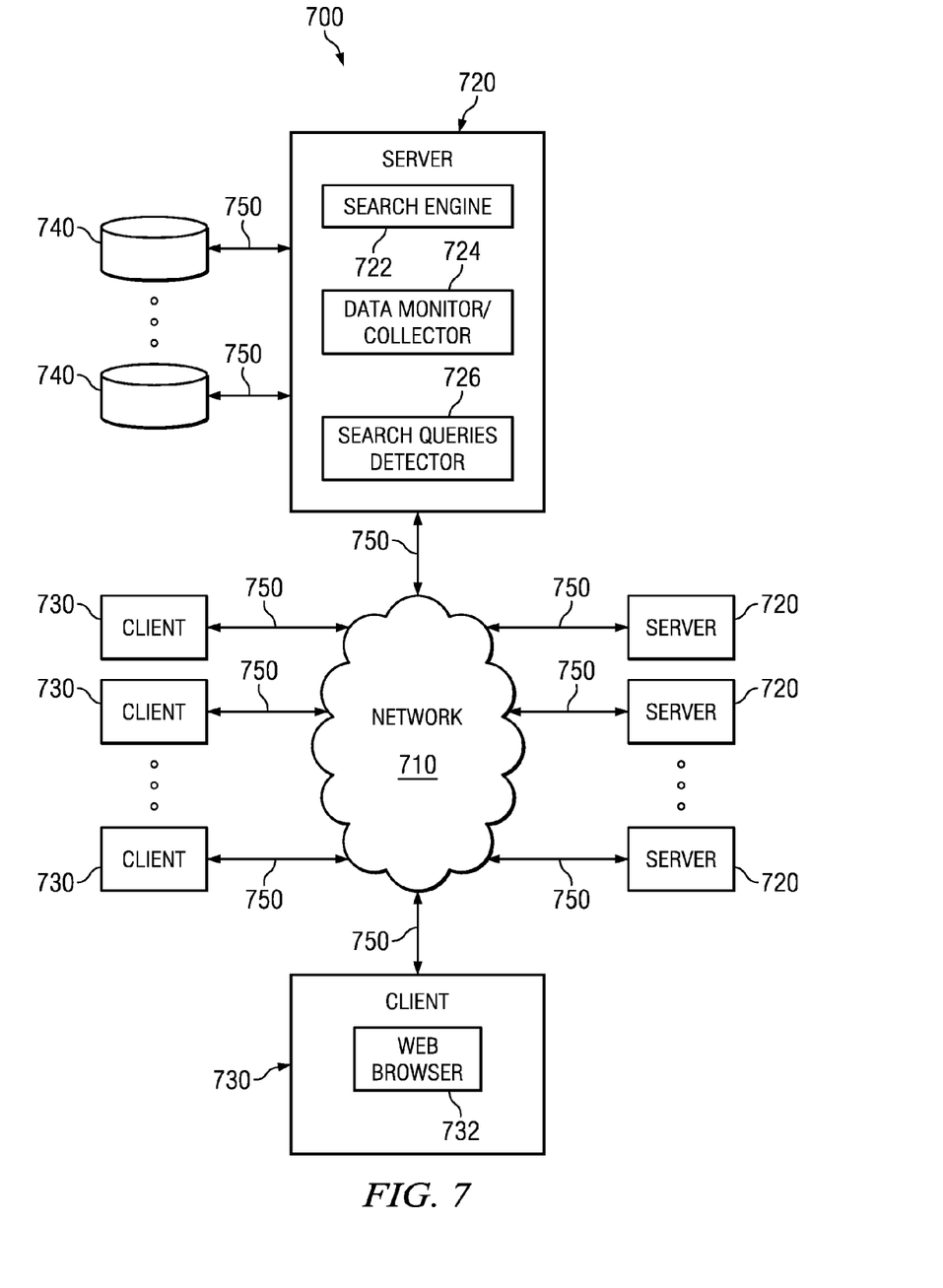
FIG. 7 illustrates an example network environment.

Particular embodiments may be implemented in a network environment. FIG. 7 illustrates an example network environment 700 suitable for providing software validation as a service. Network environment 700 includes a network 710 coupling one or more servers 720 and one or more clients 730 to each other. In particular embodiments, network 710 is an intranet, an extranet, a virtual private network (VPN), a local area network (LAN), a wireless LAN (WLAN), a wide area network (WAN), a metropolitan area network (MAN), a portion of the Internet, or another network 710 or a combination of two or more such networks 710. This disclosure contemplates any suitable network 710.

One or more links 750 couple a server 720 or a client 730 to network 710. In particular embodiments, one or more links 750 each includes one or more wireline, wireless, or optical links 750. In particular embodiments, one or more links 750 each includes an intranet, an extranet, a VPN, a LAN, a WLAN, a WAN, a MAN, a portion of the Internet, or another link 750 or a combination of two or more such links 750. This disclosure contemplates any suitable links 750 coupling servers 720 and clients 730 to network 710.

In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720. For example, a web server is generally capable of hosting websites containing web pages or particular elements of web pages. More specifically, a web server may host HTML files or other file types, or may dynamically create or constitute files upon a request, and communicate them to clients 730 in response to HTTP or other requests from clients 730. A mail server is generally capable of providing electronic mail services to various clients 730. A database server is generally capable of providing an interface for managing data stored in one or more data stores.

In particular embodiments, one or more data storages 740 may be communicatively linked to one or more severs 720 via one or more links 750. In particular embodiments, data storages 740 may be used to store various types of information. In particular embodiments, the information stored in data storages 740 may be organized according to specific data structures. In particular embodiment, each data storage 740 may be a relational database. Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functionalities implemented or supported by client 730. For example and without limitation, a client 730 may be a desktop computer system, a notebook computer system, a netbook computer system, a handheld electronic device, or a mobile telephone. This disclosure contemplates any suitable clients 730. A client 730 may enable a network user at client 730 to access network 730. A client 730 may enable its user to communicate with other users at other clients 730.

A client 730 may have a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 8:
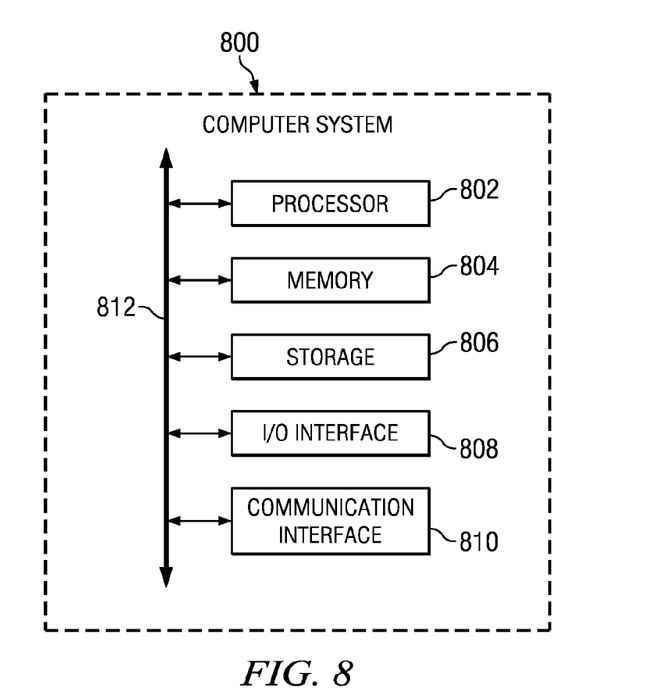
FIG. 8 illustrates an example computer system

Particular embodiments may be implemented on one or more computer systems. FIG. 8 illustrates an example computer system 800. For example, system 800 may be a node (e.g., a router) in a network (e.g., network 700). In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802.

Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What claimed is:

1. A method comprising: by one or more computing devices,
    identifying all one-hop neighbor nodes and two-hop neighbor nodes of a node;
    determining an active set of one-hop neighbor nodes for the node, comprising:
        including in the active set each one-hop neighbor node that is either an edge node or connected with at least one two-hop neighbor node with which no other one-hop neighbor nodes are connected; and
        when any two-hop neighbor node is not connected with at least one one-hop neighbor node in the active set, or a bandwidth of the active set is less than a baseline bandwidth, or a number of paths of the active set is less than a minimum number of paths, then:
            determining all combinations of one-hop neighbor nodes that are not already in the active set;
            for each combination, determining a total-energy value as a sum of energy usage of the one-hop neighbor nodes in the combination, an individual-bandwidth value for each connection between the one-hop neighbor nodes in the combination and a two-hop neighbor node, and a total-bandwidth value as a sum of the individual-bandwidth values;
            testing each combination in order, from the combination with a lowest total-energy value to the combination with a highest total-energy value, to determine whether a specific combination is able to complete the active set, wherein testing each specific combination comprises:
                determining whether including the one-hop neighbor nodes in the specific combination in the active set results in all two-hop neighbor nodes being connected with the one-hop neighbor nodes in the active set, the bandwidth of the active set is greater than or equal to the baseline bandwidth, and the number of paths of the active set is greater than or equal to the minimum number of paths; and
                when including the one-hop neighbor nodes in the specific combination in the active set results in all two-hop neighbor nodes being connected with the one-hop neighbor nodes in the active set, the bandwidth of the active set is greater than or equal to the baseline bandwidth, and the number of paths of the active set is greater than or equal to the minimum number of paths, including the one-hop neighbor nodes in the specific combination in the active set;
            when no combination is able to complete the active set, then including all one-hop neighbor nodes in the active set; and
    communicating a message to each one-hop neighbor node in the active set indicating that it is in the active set.

2. The method of claim 1, wherein, when testing each combination in order, when two or more combinations have a same total-energy value, the ones of the combinations with higher total-bandwidth values are tested before the ones of the combinations with lower total-bandwidth values.

3. The method of claim 2, wherein, when testing each combination in order, when two or more combinations have a same total-energy value and a same total-bandwidth value, the ones of the combinations with lower sums of router identifiers (IDs) are tested before the ones of the combinations with higher sums of router IDs.

4. The method of claim 1, wherein the node, the one-hop neighbor nodes, and the two-hop neighbor nodes are routers.

5. The method of claim 1, wherein an edge node is a node directly connected to one or user devices.

6. An apparatus comprising:
a memory comprising instructions executable by one or more processors; and
the one or more processors coupled to the memory and operable to execute the instructions, the one or more processors being operable when executing the instructions to:
identify all one-hop neighbor nodes and two-hop neighbor nodes of a node;
determine an active set of one-hop neighbor nodes for the node, comprising:
including in the active set each one-hop neighbor node that is either an edge node or connected with at least one two-hop neighbor node with which no other one-hop neighbor nodes are connected; and
when any two-hop neighbor node is not connected with at least one one-hop neighbor node in the active set, or a bandwidth of the active set is less than a baseline bandwidth, or a number of paths of the active set is less than a minimum number of paths, then:
determining all combinations of one-hop neighbor nodes that are not already in the active set;
for each combination, determining a total-energy value as a sum of energy usage of the one-hop neighbor nodes in the combination, an individual-bandwidth value for each connection between the one-hop neighbor nodes in the combination and a two-hop neighbor node, and a total-bandwidth value as a sum of the individual-bandwidth values;
testing each combination in order, from the combination with a lowest total-energy value to the combination with a highest total-energy value, to determine whether a specific combination is able to complete the active set, wherein testing each specific combination comprises:
determining whether including the one-hop neighbor nodes in the specific combination in the active set results in all two-hop neighbor nodes being connected with the one-hop neighbor nodes in the active set, the bandwidth of the active set is greater than or equal to the baseline bandwidth, and the number of paths of the active set is greater than or equal to the minimum number of paths; and
when including the one-hop neighbor nodes in the specific combination in the active set results in all two-hop neighbor nodes being connected with the one-hop neighbor nodes in the active set, the bandwidth of the active set is greater than or equal to the baseline bandwidth, and the number of paths of the active set is greater than or equal to the minimum number of paths, including the one-hop neighbor nodes in the specific combination in the active set;
when no combination is able to complete the active set, then including all one-hop neighbor nodes in the active set; and
communicating a message to each one-hop neighbor node in the active set indicating that it is in the active set.

7. The apparatus of claim 6, wherein, when testing each combination in order, when two or more combinations have a same total-energy value, the ones of the combinations with higher total-bandwidth values are tested before the ones of the combinations with lower total-bandwidth values.

8. The apparatus of claim 7, wherein, when testing each combination in order, when two or more combinations have a same total-energy value and a same total-bandwidth value, the ones of the combinations with lower sums of router identifiers (IDs) are tested before the ones of the combinations with higher sums of router IDs.

9. The apparatus of claim 6, wherein the node, the one-hop neighbor nodes, and the two-hop neighbor nodes are routers.

10. The apparatus of claim 6, wherein an edge node is a node directly connected to one or user devices.

11. One or more computer-readable non-transitory storage media embodying software operable when executed by one or more computer systems to:
identify all one-hop neighbor nodes and two-hop neighbor nodes of a node;
determine an active set of one-hop neighbor nodes for the node, comprising:
including in the active set each one-hop neighbor node that is either an edge node or connected with at least one two-hop neighbor node with which no other one-hop neighbor nodes are connected; and
when any two-hop neighbor node is not connected with at least one one-hop neighbor node in the active set, or a bandwidth of the active set is less than a baseline bandwidth, or a number of paths of the active set is less than a minimum number of paths, then:
determining all combinations of one-hop neighbor nodes that are not already in the active set;
for each combination, determining a total-energy value as a sum of energy usage of the one-hop neighbor nodes in the combination, an individual-bandwidth value for each connection between the one-hop neighbor nodes in the combination and a two-hop neighbor node, and a total-bandwidth value as a sum of the individual-bandwidth values;
testing each combination in order, from the combination with a lowest total-energy value to the combination with a highest total-energy value, to determine whether a specific combination is able to complete the active set, wherein test each specific combination comprises:
determining whether including the one-hop neighbor nodes in the specific combination in the active set results in all two-hop neighbor nodes being connected with the one-hop neighbor nodes in the active set, the bandwidth of the active set is greater than or equal to the baseline bandwidth, and the number of paths of the active set is greater than or equal to the minimum number of paths; and
when including the one-hop neighbor nodes in the specific combination in the active set results in all two-hop neighbor nodes being connected with the one-hop neighbor nodes in the active set, the bandwidth of the active set is greater than or equal to the baseline bandwidth, and the number of paths of the active set is greater than or equal to the minimum number of paths, including the one-hop neighbor nodes in the specific combination in the active set;

if no combination is able to complete the active set, then including all one-hop neighbor nodes in the active set; and communicating a message to each one-hop neighbor node in the active set indicating that it is in the active set.

12. The media of claim 11, wherein, when testing each combination in order, when two or more combinations have a same total-energy value, the ones of the combinations with higher total-bandwidth values are tested before the ones of the combinations with lower total-bandwidth values.

13. The media of claim 12, wherein, when testing each combination in order, when two or more combinations have a same total-energy value and a same total-bandwidth value, the ones of the combinations with lower sums of router identifiers (IDs) are tested before the ones of the combinations with higher sums of router IDs.

14. The media of claim 11, wherein the node, the one-hop neighbor nodes, and the two-hop neighbor nodes are routers.

15. The media of claim 11, wherein an edge node is a node directly connected to one or user devices.

16. A system comprising:

means for identifying all one-hop neighbor nodes and two-hop neighbor nodes of a node;

means for determining an active set of one-hop neighbor nodes for the node, comprising:

means for including in the active set each one-hop neighbor node that is either an edge node or connected with at least one two-hop neighbor node with which no other one-hop neighbor nodes are connected; and when any two-hop neighbor node is not connected with at least one one-hop neighbor node in the active set, or a bandwidth of the active set is less than a baseline bandwidth, or a number of paths of the active set is less than a minimum number of paths, then:

means for determining all combinations of one-hop neighbor nodes that are not already in the active set;

for each combination, means for determining a total-energy value as a sum of energy usage of the one-hop neighbor nodes in the combination, an individual-bandwidth value for each connection between the one-hop neighbor nodes in the combination and a two-hop neighbor node, and a total-bandwidth value as a sum of the individual-bandwidth values;

means for testing each combination in order, from the combination with a lowest total-energy value to the combination with a highest total-energy value, to determine whether a specific combination is able to complete the active set, wherein testing each specific combination comprises:

means for determining whether including the one-hop neighbor nodes in the specific combination in the active set results in all two-hop neighbor nodes being connected with the one-hop neighbor nodes in the active set, the bandwidth of the active set is greater than or equal to the baseline bandwidth, and the number of paths of the active set is greater than or equal to the minimum number of paths; and means for including the one-hop neighbor nodes in the specific combination in the active set when including the one-hop neighbor nodes in the specific combination in the active set results in all two-hop neighbor nodes being connected with the one-hop neighbor nodes in the active set, the bandwidth of the active set is greater than or equal to the baseline bandwidth, and the number of paths of the active set is greater than or equal to the minimum number of paths;

means for including all one-hop neighbor nodes in the active set when no combination is able to complete the active set; and means for communicating a message to each one-hop neighbor node in the active set indicating that it is in the active set.

* * * * *